(12) United States Patent
Sung

(10) Patent No.: US 7,405,912 B2
(45) Date of Patent: Jul. 29, 2008

(54) ARC FAULT DETECTION APPARATUS USING MICROCOMPUTER

(76) Inventor: Sam Kyoung Sung, #1303., 115-dong, LG jaei 1st Apt., Sinbong-dong, Yongin-si, Gyeonggido, 449-533 (KR)

( * ) Notice: Subject to any disclaimer, the term of this patent is extended or adjusted under 35 U.S.C. 154(b) by 340 days.

(21) Appl. No.: 11/353,325

(22) Filed: Feb. 14, 2006

(65) Prior Publication Data

US 2007/0188947 A1     Aug. 16, 2007

(51) Int. Cl.
    *H02H 3/16*    (2006.01)
(52) U.S. Cl. .......................................... 361/42; 361/44
(58) Field of Classification Search ............... 361/42, 361/43, 44; 324/522, 536; 702/58, 117
    See application file for complete search history.

(56) References Cited

U.S. PATENT DOCUMENTS 7,106,069 B2 *    9/2006    Kim et al. ................. 324/522

\* cited by examiner

*Primary Examiner*—Stephen W Jackson
*Assistant Examiner*—Danny Nguyen
(74) *Attorney, Agent, or Firm*—Jordan and Hamburg LLP

(57) ABSTRACT

The present invention relates to an arc fault detection apparatus using a microcomputer, which divides current paths into a low current path and a high current path depending on the intensity of load current using a source voltage that is applied to a lead wire and determines whether an arc fault signal exists, and which presets a circuit breaking time against the generation of an arc, corresponding to the magnitude of a load, and immediately breaks a circuit if a corresponding arc fault signal is detected within the preset circuit breaking time.

3 Claims, 2 Drawing Sheets

ARC FAULT DETECTION APPARATUS USING MICROCOMPUTER

BACKGROUND OF THE INVENTION

1. Field of the Invention

The present invention relates, in general, to an arc fault detection apparatus and, more particularly, to an arc fault detection apparatus using a microcomputer, which divides current paths into a low current path and a high current path depending on the intensity of load current using a source voltage that is applied to a lead wire and determines whether an arc fault signal exists, and which presets a circuit breaking time against the generation of an arc, corresponding to the magnitude of a load, and immediately breaks a circuit if a corresponding arc fault signal is detected within the preset circuit breaking time.

2. Description of the Related Art

As well known to those skilled in the art, arc faults (series, parallel or ground arcs) occur along electric wiring, and are phenomena occurring due to physical or electric defects caused by the aging or breakdown of wires, defective insulation or overcurrent. Such an arc fault is a major factor in causing fires, so that, recently, a circuit breaker for arc fault protection to break a power supply circuit when an arc occurs on an electrical appliance must be mandatorily used in the U.S.A.

As prior arts related to such an arc fault detector, there are Korean Pat. Appln. Nos. 10-2004-59272 and 10-2004-62043.

The prior arts disclose arc fault detection apparatuses, which detect a source voltage applied to a lead wire and determine whether an arc fault has occurred, thus eliminating malfunction caused by a current detection scheme that is the technology previous to the prior arts, which divide current paths into two paths depending on the intensity of load current generated from the lead wire and determine whether an arc fault occurs based on voltage detection, thus preventing malfunction caused by a pseudo arc signal, and which shorten a circuit breaking time according to the magnitude of a load, thus greatly decreasing risk of causing fires.

Therefore, with the development of the prior arts, advanced technology has been provided to easily detect an arc generated at a load current below a rated current, as well as a load current above the rated current, so as to promptly break a circuit, and, in addition, to eliminate a malfunction of misconceiving a pseudo arc signal, generated due to the construction of various (a plurality of) loads, as an actual arc signal and erroneously breaking a circuit.

However, in the prior arts, the core technology is a method of storing a detection signal, which oscillates in and is input from an analog circuit, in a capacitor, comparing the stored signal with a preset reference signal, and outputting comparison results when current paths are divided into a low current path and a high current path according to the magnitude of a load and it is determined whether an arc fault signal exists. Therefore, output time is not uniform because of the discharging time of the capacitor, so that there may occur several malfunctions in such a way that an arc cutoff time (the period ranging from the generation of an arc to the breaking of a circuit) is not exact.

SUMMARY OF THE INVENTION

Accordingly, the present invention has been made keeping in mind the above problems occurring in the prior art, and an object of the present invention is to provide an arc fault detection apparatus using a microcomputer, which divides current paths into a low current path and a high current path depending on the intensity of load current using a source voltage that is applied to a lead wire and determines whether an arc fault signal exists, and which presets a circuit breaking time against the generation of an arc, corresponding to the magnitude of a load, and immediately breaks a circuit if a corresponding arc fault signal is detected within the preset time.

In order to accomplish the above object, the present invention provides an arc fault detection apparatus, comprising a voltage detection unit for detecting voltage variation according to time with respect to source power; a first frequency band setting unit for setting a frequency band of a signal output from the voltage detection unit to correspond to intensity of low-load current; a first filter unit for detecting high-frequency signals from output signals of the first frequency band setting unit; a level limiting unit for limiting a level of dimmer signals to discriminate the dimmer signals from arc signals of output signals of the first filter unit; a second filter unit for detecting a high-frequency signal from level-limited signals output from the level limiting unit, thus detecting only a frequency band of the arc signals; a first frequency limiting amplification unit for limiting and amplifying a frequency band of the signal detected by the second filter unit, and providing an amplified frequency band-limited signal to a microcomputer; a second frequency band setting unit for setting a frequency band of the signal output from the voltage detection unit to correspond to intensity of high-load current; a third filter unit for detecting a high-frequency signal from output signals of the second frequency band setting unit; a second frequency limiting amplification unit for limiting and amplifying a frequency band of the signal detected by the third filter unit, and providing an amplified frequency band-limited signal to the microcomputer; a current detection unit disposed in a lead wire between the source power and a load to detect current variation according to time; a current saturation setting unit for setting a current saturation time of a signal, detected by the current detection unit according to load; a first amplification unit for amplifying a signal output from the current saturation setting unit without inverting the signal; a second amplification unit for inversely amplifying the signal output from the current saturation setting unit; a full-wave rectifying unit for combining half-wave signals output from the first and second amplification units, thus outputting a full-wave signal; a Direct Current (DC) conversion unit for converting the full-wave signal output from the full-wave rectifying unit into a DC signal; and the microcomputer for detecting arc signals that are received from the first and second frequency limiting amplification units and are detected based on low and high current detection paths, receiving the DC signal input through the DC conversion unit to set an arc cutoff time according to magnitude of the load, detecting arc signals received through the low and high current detection paths within the set arc cutoff time, determining that an arc fault signal is generated if the number of arc signals detected is equal to or greater than a preset number, and then outputting a circuit breaking signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
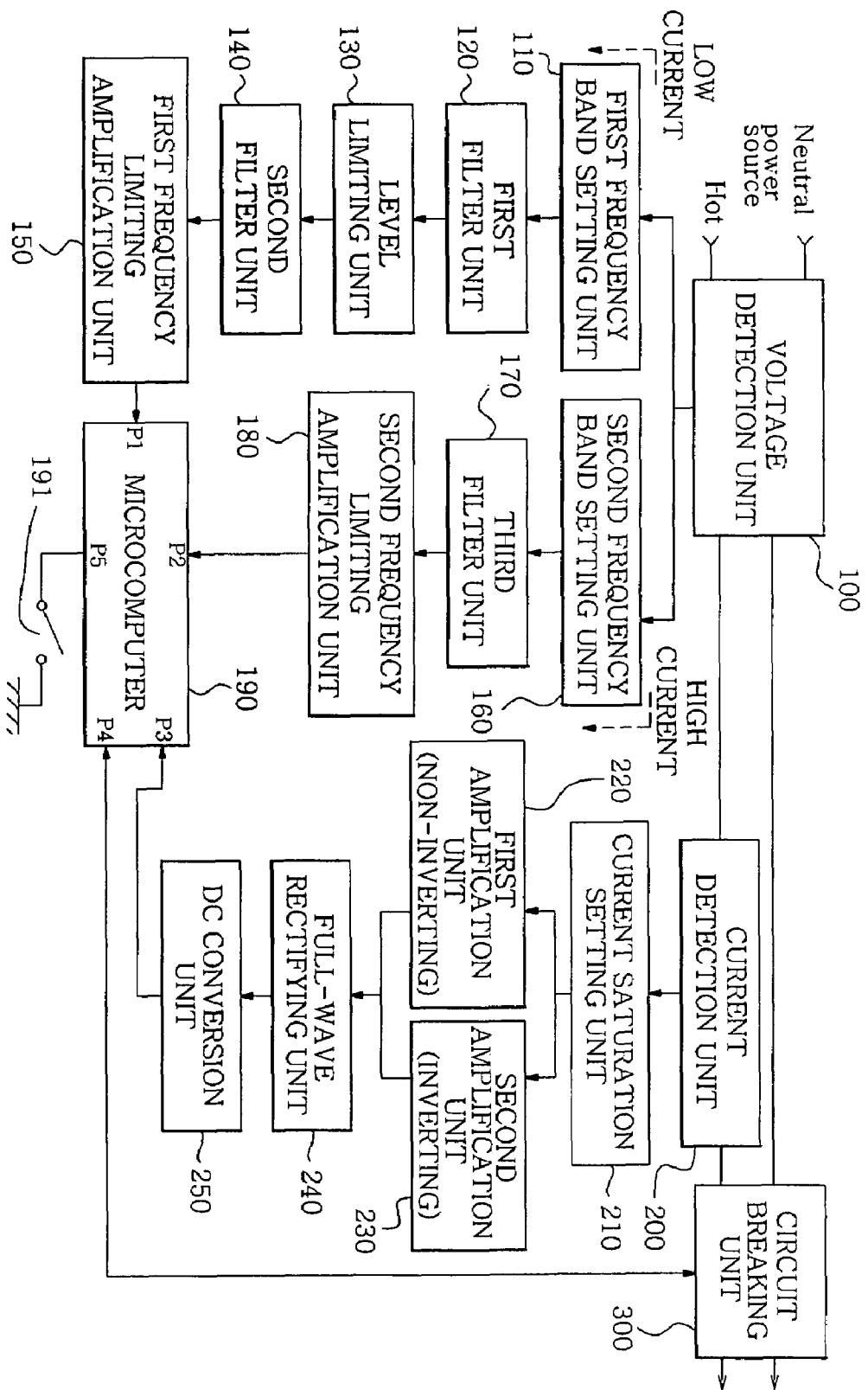
FIG. 1 is a block diagram of an arc fault detection apparatus using a microcomputer according to the present invention.

Hereinafter, embodiments of the present invention will be described in detail with reference to the attached drawings.

Reference now should be made to the drawings, in which the same reference numerals are used throughout the different drawings to designate the same or similar components.

FIG. 1 is a block diagram of an arc fault detection apparatus using a microcomputer according to the present invention.

As shown in FIG. 1, the arc fault detection apparatus using a microcomputer according to the present invention includes a voltage detection unit 100, a first frequency band setting unit 110, a first filter unit 120, a level limiting unit 130, a second filter unit 140, a first frequency limiting amplification unit 150, a second frequency band setting unit 160, a third filter unit 170, a second frequency limiting amplification unit 180, a microcomputer 190, a current detection unit 200, a current saturation setting unit 210, a first amplification unit 220, a second amplification unit 230, a full-wave amplification unit 240, a Direct Current (DC) conversion unit 250 and a circuit breaking unit 300.

The voltage detection unit 100 detects voltage variation according to time with respect to source power. The voltage detection unit 100 full-wave rectifies the voltage between a hot wire and a neutral wire using a bridge diode (not shown), and detects voltage using a rectified signal.

The first frequency band setting unit 110, which is adapted to set the frequency band of the signal output from the voltage detection unit 100, sets a frequency band according to the intensity of low-load current, thus setting a frequency band for a low current detection path.

The first filter unit 120 detects high-frequency signals from the output signals of the first frequency band setting unit 110, and limits signals other than the high-frequency signal. The first filter unit 120 detects the frequency range of dimmer signals, having a frequency band overlapping with that of arc signals. The reason for this is that the frequency band of the arc signals is not detected when the frequency band of the dimmer signals is limited. Therefore, the first filter unit 120 consequently simultaneously detects both the arc signals and the dimmer signals.

The level limiting unit 130 limits the level of the dimmer signals of the output signals of the first filter unit 120. This operation is performed to discriminate the dimmer signals from the arc signals by limiting the level of the dimmer signals.

The second filter unit 140 detects a high-frequency signal from the level-limited signals output from the level limiting unit 130 and detects only a frequency band of the arc signals.

The first frequency limiting amplification unit 150 amplifies the level of the signal detected by the second filter unit 140. The first frequency limiting amplification unit 150 limits and amplifies a frequency band to minimize the influence of the devices of the first frequency limiting amplification unit, and provides the output signal thereof to the input port P1 of the microcomputer 190.

The second frequency band setting unit 160, which is adapted to set the frequency band of the signal output from the voltage detection unit 100, sets a frequency band according to the intensity of high-load current, thus setting the frequency band for a high current detection path.

The third filter unit 170 detects a high-frequency signal from the output signals of the second frequency band setting unit 160, and does not require a separate level limiting unit because the third filter unit 170 controls load current equal to or higher than the current of a dimmer load in a high current detection path, unlike the first filter unit 120.

The second frequency limiting amplification unit 180 amplifies the level of the signal detected by the third filter unit 170. The second frequency limiting amplification unit 180 limits and amplifies a frequency band to minimize the influence of devices, and provides the output signal thereof to the input port P2 of the microcomputer 190.

The microcomputer 190 detects an arc signal received from the first frequency limiting amplification unit 150 through a low current detection path, using the input port P1 thereof, detects an arc signal received from the second frequency limiting amplification unit 180 through a high current detection path, using the input port P2 thereof, and receives a DC voltage input from the DC conversion unit 250 to ascertain the magnitude of a load, using the input port P3 thereof.

The microcomputer 190 sets an arc cutoff time preset according to ascertained load magnitude, detects arc signals received through the input port P1 or P2 within the set arc cutoff time, and determines that an arc fault signal is generated if the number of arc signals received is equal to or greater than a preset number.

According to an embodiment of the present invention, the basis for counting the number of arc signals received through the input port P1 or P2 is the half wave of a sine wave (60 Hz, 8 ms). The microcomputer 190 monitors arc signals at each half wave (8 ms) of an input sine wave, and determines the number of arc signals.

The microcomputer 190 outputs a circuit breaking signal through the output port P4 thereof, thus operating the circuit breaking unit 300. The input port P5 of the microcomputer 190 is connected to a test switch 191, and is operated so that, if the test switch 191 is turned on, the microcomputer 190 also outputs a circuit breaking signal through the output port P4.

The current detection unit 200 is disposed in a hot wire between source power and the load to detect current variation according to time.

The current saturation setting unit 210 sets a current saturation time for signals detected by the current detection unit 200. The current saturation setting unit 210 outputs the current signals detected by the current detection unit 200 in the form of proportional intensities until the current signal reaches the rated load current of the arc fault detection apparatus.

The first amplification unit 220 amplifies each signal output from the current saturation setting unit 210 without inverting the signal. Further, the first amplification unit 220 uses a single power source, not dual power sources, for the supply voltage of an amplifier (an Operational Amplifier: OP AMP, not shown) constituting the first amplification unit 220. That is, a negative voltage (−VCC) is used as a ground voltage (GND: 0V), so that, of the signals output from the current saturation unit 210, a negative (−) voltage is not output, but only a half wave signal, which is a positive (+) voltage signal, is output.

The reason for implementing the above construction is to prevent amplified power from the first amplification unit 220 from increasing compared to the supply power. Therefore, a portion of the amplified power higher than the supply power is clipped. For example, if ±12V is used as the supply voltage of the amplification unit, an output voltage higher than +12V, or lower than −12V is not output. The amplification ratio of the first amplification unit 220 is set so that the intensity of the amplified output signal is not clipped until current intensity reaches the rated load current of the arc fault detection apparatus.

The second amplification unit 230 inversely amplifies each signal output from the current saturation setting unit 210. Similar to the first amplification unit 220, a negative (−) voltage of the output signal of the second amplification unit 230 is not output, but only a half wave signal, which is a positive (+) voltage signal, is output.

The full-wave rectifying unit 240 combines the signals output from the first and second amplification units 220 and 230 and outputs a full-wave signal. The reason for implementing the full-wave rectifying unit 240 at the output stage of the amplified signals is to eliminate a phenomenon of causing a signal to be reduced or distorted due to rectifying devices (half-wave) because the intensity of the signal output from the current detection unit 200 is too weak.

The DC conversion unit 250 converts the analog signal output from the full-wave rectifying unit 240 into a DC signal and provides the DC signal to the input port P3 of the microcomputer 190.

The circuit breaking unit 300 is connected to the output port P4 of the microcomputer 190, thus breaking the circuit under the output control of the microcomputer 190.

Figure 2:
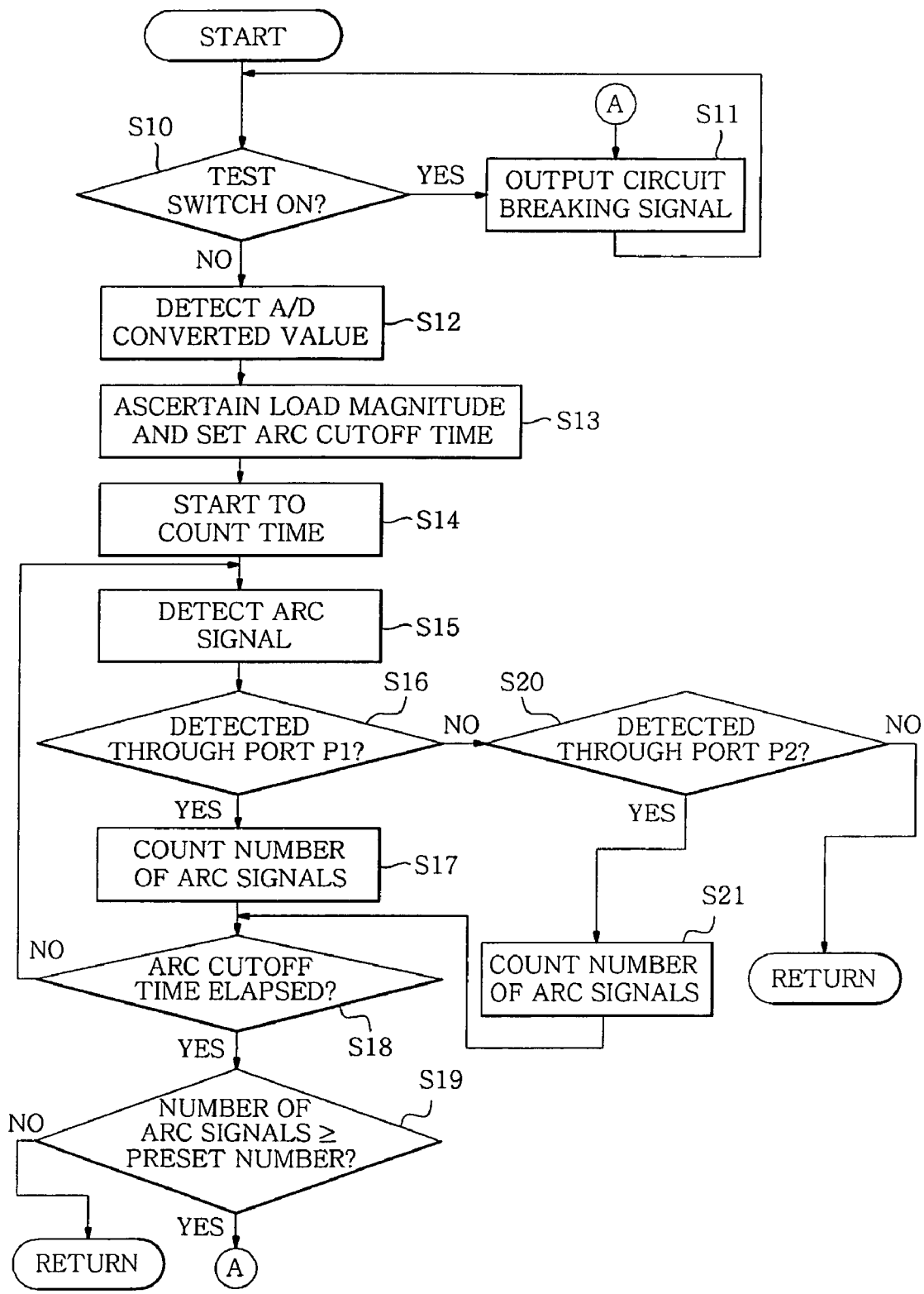
FIG. 2 is a flowchart of a process of controlling the arc fault detection apparatus using a microcomputer according to the present invention.

FIG. 2 is a flowchart of a process of controlling the arc fault detection apparatus using a microcomputer according to the present invention.

As shown in FIG. 2, the process of controlling the arc fault detection apparatus using a microcomputer according to the present invention is executed as follows. First, it is determined whether the test switch 191 is turned on, through the input port P5 at step S10. If the test switch 191 is turned on at step S10, a circuit breaking signal is output at step S11, whereas if the test switch 191 is not turned on at step S10, an A/D conversion signal (DC) is detected through the input port P3 at step S12. The magnitude of a load corresponding to the DC value detected at step S12 is ascertained, and a preset arc cutoff time corresponding to the ascertained load is set at step S13. Time counting is started at step S14, and an arc signal received through the input port P1 or P2 is detected at step S15. It is determined whether the arc signal is detected through the input port P1 at step S16. If the arc signal is detected through the input port P1 at step S16, the number of arc signals detected is counted at step S17. It is determined whether the arc cutoff time has elapsed at step S18. If the arc cutoff time has not elapsed at step S18, the process proceeds to arc signal detection step S15, whereas if the arc cutoff time has elapsed, it is determined whether the number of arc signals currently counted is equal to or greater than a preset number at step S19. If the number of arc signals currently counted is less than the preset number at step S19, the process returns to the initial step thereof, whereas if the number of arc signals currently counted is equal to or greater than the preset number, the process proceeds to step S11 of outputting a circuit breaking signal through the output port P4.

If an arc signal is not detected through the input port P1 at step S16, it is determined whether an arc signal is detected through the input port P2 at step S20. If an arc signal is not detected through the input port P2 at step S20, the process returns to the initial step thereof, whereas if an arc signal is detected through the input port P2 at step S20, the number of arc signals detected is counted at step S21, and then the process returns to step S18 of determining whether an arc cutoff time has elapsed.

The operation of the arc fault detection apparatus using a microcomputer according to the present invention, having the above construction, is described below.

First, the voltage between a hot wire and a neutral wire is full-wave rectified using a rectifier (bridge diode: BD) by the voltage detection unit 100, and the voltage is output using a rectified signal.

The voltage output from the voltage detection unit 100 is limited to a preset frequency band (a frequency band corresponding to the intensity of low-load current) by the first frequency band setting unit 110, and the frequency band-limited voltage is output to the first filter unit 120. Simultaneously, the output voltage of the voltage detection unit 100 is limited to a preset frequency band (a frequency band corresponding to the intensity of high-load current) by the second frequency band setting unit 160, and the frequency band-limited voltage is output to the third filter unit 170.

The first filter unit 120 detects a high-frequency signal from the output signal of the first frequency band setting unit 110, and outputs the detected signal. Therefore, a dimmer signal, which is a pseudo arc signal, is detected together with an arc signal, which is a high-frequency signal.

Further, the high-frequency signal output from the first filter unit 120 limits the level of the dimmer signal while passing through the level limiting unit 130. This operation is performed to discriminate the dimmer signal from the arc signal by limiting the level of the dimmer signal.

Of the signal output from the level limiting unit 130, only a high-frequency signal is output through the second filter unit 140. Since the second filter unit 140 detects only the frequency band of an arc signal, only an arc signal is detected when the arc signal exists.

The signal output from the second filter unit 140 is input to the first frequency limiting amplification unit 150. The first frequency limiting amplification unit 150 amplifies the level of the signal detected by the second filter unit 140, and provides the amplified signal to the input port P1 of the microcomputer 190.

Further, of the signal output from the second frequency band setting unit 160, only a high-frequency signal is detected and output by the third filter unit 170. The third filter unit 170 controls load current equal to or higher than the current of a dimmer load, so that a separate level limiting unit is not implemented.

The signal output from the third filter unit 170 is amplified by the second frequency limiting amplification unit 180, and the amplified signal is input to the input port P2 of the microcomputer 190.

Meanwhile, current applied to the load through source power is detected by the current detection unit 200, and the detected current signal is detected as a suitable voltage by the current saturation setting unit 210.

In this case, the current saturation setting unit 210 adjusts a set value to set a saturation current value. This setting is suitably performed depending on the current condition or status of a load. The current saturation setting unit 210 outputs a sine wave having low intensity. The sine wave is input both to the first amplification unit 220 and the second amplification unit 230. A half-wave rectified signal, which is amplified without inversion, is output through the first amplification unit 220. A half-wave rectified signal, which has a phase difference of 90° with respect to the output of the first amplification unit 220, is output through the second amplification unit 230.

The output signals of the first and second amplification units 220 and 230 are generated as a full-wave rectified signal while passing through the full-wave rectifying unit 250.

The output signal of the full-wave rectifying unit 240 is converted into a DC signal by the DC conversion unit 250 and the DC signal is output from the DC conversion unit 250. The (A/D) converted signal (DC signal) is input to the input port P3 of the microcomputer 190. Therefore, the microcomputer 190 detects values input through the input ports P1 to P3 and P5, and outputs a circuit breaking signal to the circuit breaking unit 300 when an arc fault signal is detected or when a key input is sensed by the test switch 191.

This operation is described in detail below. The microcomputer 190 determines whether the test switch 191 is turned on through the input port P5, and outputs a circuit breaking signal through the output port P4 to operate the circuit breaking unit 300 if the test switch 191 is turned on, thus breaking the circuit at steps S10 and S11.

Further, the microcomputer 190 detects the A/D converted signal (DC) through the input port P3, ascertains the magnitude of a load corresponding to the detected DC value, sets an arc cutoff time (a period ranging from the generation of an arc to the breaking of the circuit) corresponding to the ascertained load magnitude, and starts to count the set time at steps S12 to S14.

In this case, the set time is set again depending on a DC value input to the input port P3, that is, the magnitude of a load.

If the counting of the set arc cutoff time is started, the microcomputer 190 detects an arc signal received through the input port P1 or P2.

If an arc signal has been detected through the input port P1 or P2, the microcomputer 190 counts the number of arc signals detected, at steps S15 to S17, and S20 and S21.

In this case, the basis for counting the number of arc signals received through the input port P1 or P2 is the half wave (60 Hz, 8 ms) of a sine wave. The microcomputer 190 monitors arc signals at each half wave (8 ms) of an input sine wave and determine the number of arc signals. In this case, the number of arc signals is set based on experimental values, and is included in the microcomputer 190.

Further, it is determined whether the arc cutoff time has elapsed. If the arc cutoff time has elapsed, and the number of arc signals received through the input port P1 or P2 is equal to or greater than a preset number, the microcomputer 190 determines that an arc fault signal is generated, and outputs a circuit breaking signal through the output port P4 to operate the circuit breaking unit 300, thus breaking the circuit at steps S18 and S19.

However, if the arc cutoff time has elapsed and the number of arc signals received through the input port P1 or P2 is less than the preset number, the microcomputer 190 determines that any signal (a pseudo arc signal, etc.) other than an arc fault signal is generated, and does not output a circuit breaking signal through the output port P4. The process returns to the initial stage thereof.

As described above, the present invention provides an arc fault detection apparatus using a microcomputer, which divides current paths into a low current path and a high current path, depending on the intensity of load current, using a source voltage applied to a lead wire and determines whether an arc fault signal is generated, and which presets a circuit breaking time against the generation of an arc corresponding to the magnitude of a load, and immediately breaks a circuit if a corresponding arc fault signal is detected within the preset time, thus eliminating malfunction, realizing a very exact arc cutoff time and promptly breaking a circuit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An arc fault detection apparatus, comprising:
a voltage detection unit for detecting voltage variation according to time with respect to a source power;
a first frequency band setting unit for setting a first frequency band of a signal output from the voltage detection unit to correspond to an intensity of a low-load current;
a first filter unit for detecting high-frequency signals from output signals of the first frequency band setting unit;
a level limiting unit for limiting a level of dimmer signals to discriminate the dimmer signals from arc signals of output signals of the first filter unit;
a second filter unit for detecting a high-frequency signal from level-limited signals output from the level limiting unit, thus detecting only a frequency band of the arc signals;
a first frequency limiting amplification unit for limiting and amplifying a frequency band of the signal detected by the second filter unit, and providing an amplified frequency band-limited signal to a microcomputer;
a second frequency band setting unit for setting a second frequency band of a signal output from the voltage detection unit to correspond to an intensity of a high-load current;
a third filter unit for detecting a high-frequency signal from output signals of the second frequency band setting unit;
a second frequency limiting amplification unit for limiting and amplifying a frequency band of the signal detected by the third filter unit, and providing an amplified frequency band-limited signal to the microcomputer;
a current detection unit disposed in a lead wire between the source power and a load to detect current variation according to time;
a current saturation setting unit for setting a current saturation time of a signal, detected by the current detection unit according to the load;
a first amplification unit for amplifying a signal output from the current saturation setting unit without inverting the signal;
a second amplification unit for inversely amplifying the signal output from the current saturation setting unit;
a full-wave rectifying unit for combining half-wave signals output from the first and second amplification units, thus outputting a full-wave signal;
a Direct Current (DC) conversion unit for converting the full-wave signal output from the full-wave rectifying unit into a DC signal; and
the microcomputer for detecting the arc signals that are received from the first and second frequency limiting amplification units and are detected based on low and high current detection paths, receiving the DC signal input through the DC conversion unit to set an arc cutoff time according to a magnitude of the load, detecting the arc signals received through the low and high current detection paths within the set arc cutoff time, determining that an arc fault signal is generated if the number of the arc signals detected is equal to or greater than a preset number, and then outputting a circuit breaking signal.

2. The arc fault detection apparatus according to claim 1, wherein the microcomputer monitors the arc signals, which are sine waves received through the low and high current detection paths, at each half wave (60 Hz, 8 ms), thus determining the number of the arc signals.

3. The arc fault detection apparatus according to claim 1, wherein the microcomputer has an input port connected to a test switch, and is operated so that, if the test switch is turned on, the microcomputer outputs the circuit breaking signal.

* * * * *